United States Patent [19]
Shoberg

[11] 3,771,359
[45] Nov. 13, 1973

[54] LOAD CELL

[75] Inventor: Ralph S. Shoberg, Farmington, Mich.

[73] Assignee: GSE, Incorporated, Livonia, Mich.

[22] Filed: May 17, 1972

[21] Appl. No.: 254,117

[52] U.S. Cl.............................................. 73/141 A
[51] Int. Cl. ............................................... G01l 1/22
[58] Field of Search ...................... 73/141 A, 133 R; 338/5

[56] References Cited
UNITED STATES PATENTS

| 3,427,875 | 2/1969 | Saxl | 73/141 A |
| 3,365,689 | 1/1968 | Kutsay | 73/141 A X |

*Primary Examiner*—Jerry W. Myracle
*Attorney*—Gerald E. McGlynn, Jr. et al.

[57] ABSTRACT

A load cell is disclosed for measuring forces and moments with respect to two or three axes of measurement. A combination of load cell geometry and strain gage arrangement results in the measurement of all quantities as a function of shear stress.

18 Claims, 7 Drawing Figures

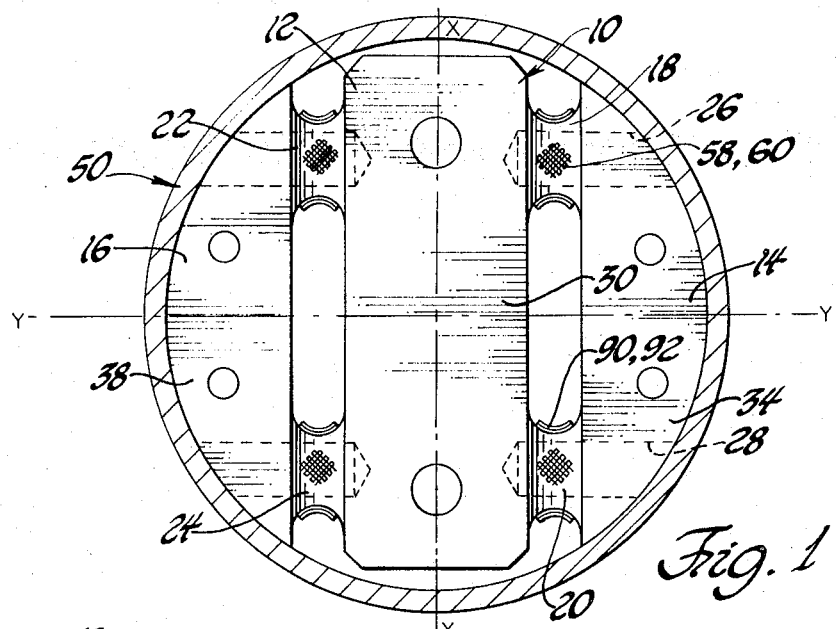
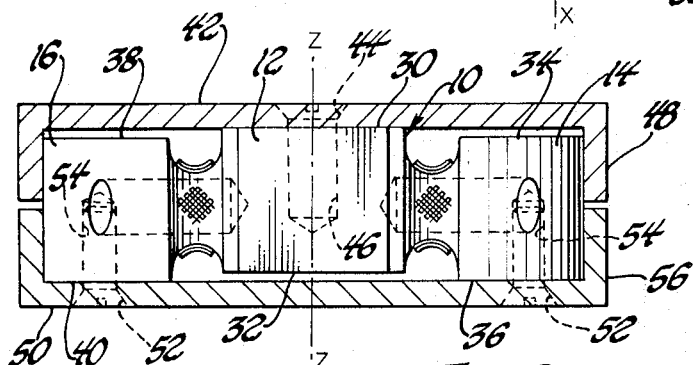
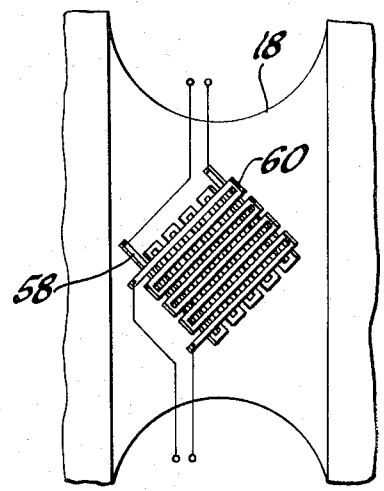
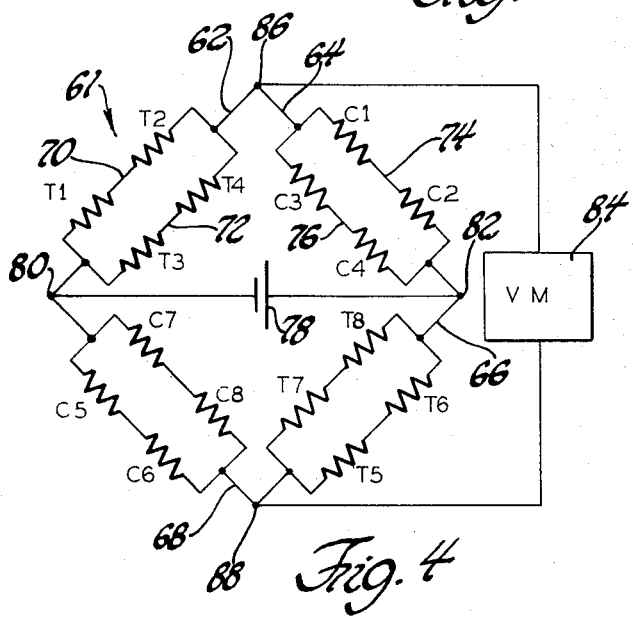

LOAD CELL

INTRODUCTION

This invention relates to force transducers, commonly called load cells, and particularly to a force transducer in which load forces are measured along a plurality of axes of sensitivity exclusively as a function of shear stress.

BACKGROUND OF THE INVENTION

Single-axis force transducers are well known and find application in many situations where load and stress analysis is desired. For example, it is quite common to employ force transducers in the testing of numerous automotive components in environments including crash tests. A load problem can often be satisfactorily analyzed using one or more single axis transducers. In other cases the proper analysis of the stress and load factors involved requires a multiaxis force transducer. The realization of accurate data from a multiaxial device is complicated by interaxial effects; i.e., a tensile load along one axis usually sets up compressive loads along the other axes such that the transducer body itself gives rise to an analysis error. In addition, the strain-sensitive elements in such multiaxial devices often require very precise and difficult compensation in order to balance out various other error effects.

BRIEF DESCRIPTION OF THE INVENTION

According to the present invention, a highly-accurate multiaxial force transducer is provided wherein load forces as well as moments are measured with reference to two or more sensitive axes exclusively by response to shear stress. In accordance with the present invention, the interaxial effects are, therefore, eliminated in that the transducer is rendered insensitive to bending and torsion as well as tension and compression in the flexure areas.

In general, this is accomplished by means of a transducer having an integral body of a high modulus of elasticity material, such as tool steel or aluminum, the body being effectively divided into at least two major portions between which a load is imposed. The two or more major portions are interconnected by struts of greatly reduced cross-section, these struts constituting the flexure areas. Strain sensitive means, such as strain gauge resistors, are disposed on the struts in such an arrangement and interconnected as to respond only to shear stresses in the struts. Accordingly, a two-axis device involves a plurality of struts extending along or parallel to an axis which is mutually perpendicular to the two sensitive axes and a three axis device involves a plurality of struts, some of which extend along or parallel to one axis and others of which extend along or parallel to another axis which is perpendicular to the first.

As indicated above, the subject invention is readily embodied in two and three axis force transducers, a specific and preferred example of each being hereinafter described in great detail. In the preferred form of each embodiment, the loads are imposed through plate members which are connected exclusively to respective major portions of the transducer body on opposite sides thereof along a central axis. In the illustrated embodiments, the transducer body is essentially disk shaped with the corresponding surfaces on opposite sides of the body being parallel but noncoplanar as between the two or more major portions of the body. Accordingly, one plate member is mechanically secured exclusively to the plane surface or surfaces of one major area on one side of the body and the other plate member is secured exclusively to the plane surface or surfaces of the other major body portion on the other side of the body. The plates, thus, act as load transfer mechanisms and, as hereinafter described in greater detail, also serve as mechanical stops to prevent stressing of the load cell body beyond the elastic limits of the material.

Another feature of the preferred embodiments of the invention is the use of load transfer plates having perimeter flanges to enhance the resistance of the device to bending or torsional strains.

Another feature of the invention as hereinafter described in greater detail is the use of stacked or laminated strain gage resistor pairs, these stacked or laminated pairs being disposed on the flexure struts and interconnected in an electrical bridge network which, for each axis of sensitivity, provides accurate compensation for all unwanted force components including tension, compression, bending, and torsion. The result is that the network responds only to shear force on the struts. In general, the resistive bridges preferably comprise four bridge legs each leg including two parallel-connected paths having two series resistors in each path. The series connected resistors in each path are of like load type, i.e., tension or compression, and are disposed on axially opposite sides of the force transducer body. Moreover, the individual sensitive axes of the resistors in each stacked pair are mutually perpendicular and nonaligned with the longitudinal axis of the strut on which they are disposed. Accordingly, the application of a suitable dc or ac voltage source across one pair of bridge terminals and the application of a suitable voltage-responsive meter across the other pair of bridge terminals results in a highly accurate load analysis by reference to shear stresses and, hence, the complete isolation of each axis of sensitivity in the force transducer is accomplished.

Various other features and advantages of the invention will become apparent from a reading of the following specification which describes two specific and preferred embodiments of the invention in detail.

BRIEF DESCRIPTION OF THE DRAWINGS

FIG. 1 is a plan view of a two-axis load cell embodying the invention;

FIG. 2 is an end view, partly in cross-section, of the force transducer of FIG. 1;

FIG. 3 is an enlarged view of a strut in the device of FIG. 1 showing the orientation of the strain gage resistors thereon;

FIG. 4 is an electrical schematic diagram of a bridge network for use in connection with the strain gage resistors in the force transducer of FIGS. 1 and 2;

FIG. 5 is a table indicating the relation of the strain gage resistors in the circuit of FIG. 4 to the struts in the device of FIG. 1;

DETAILED DESCRIPTION OF THE SPECIFIC EMBODIMENTS

Figure 6:
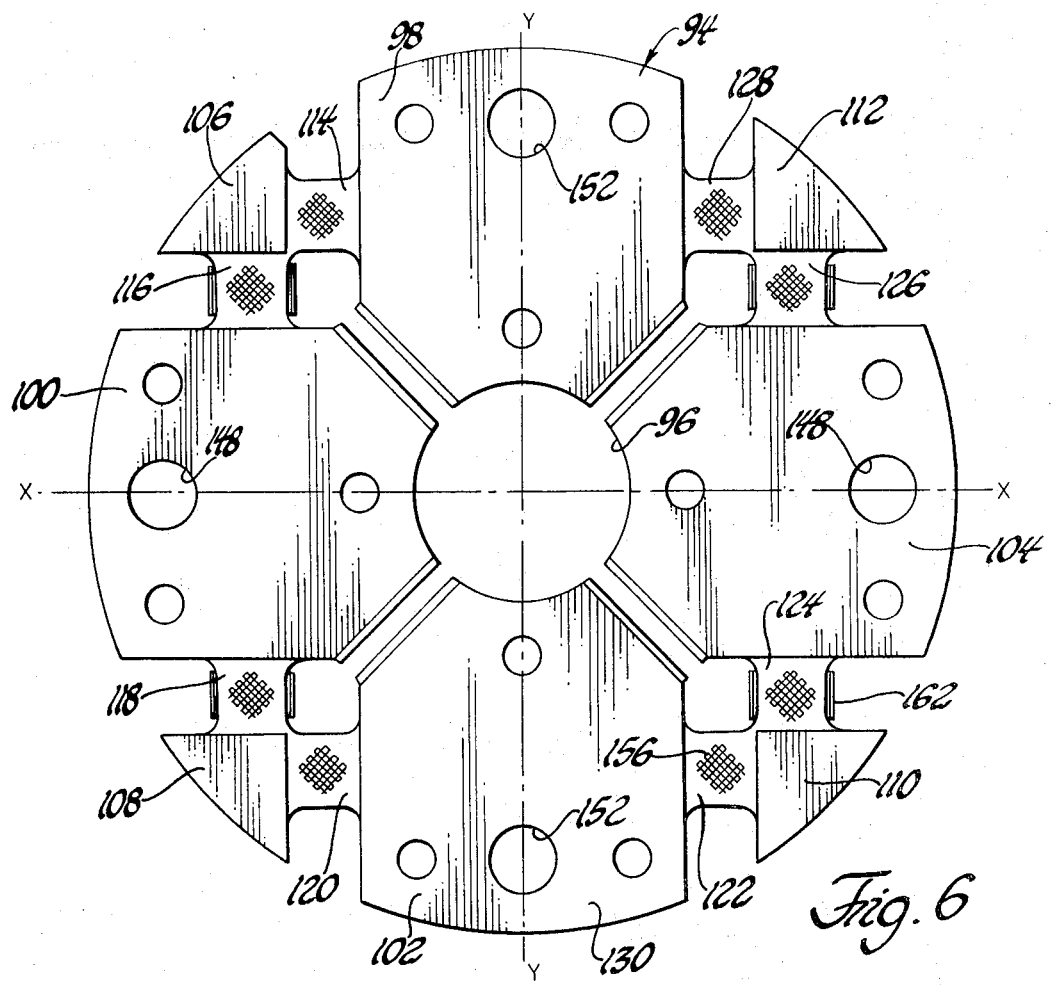
FIG. 6 is a plan view of a three-axis load cell embodying the invention.

Looking now to FIGS. 1 and 2, a two-axis force transducer is shown to comprise a transducer body 10 having a generally disk-like shape and being fabricated from solid material having a high modulus of elasticity, such as tool steel or aluminum. The transducer body 10 is a solid, integral unit, but is machined into a configuration which defines a rigid, major body portions 12, 14, and 16 of which body portion 12 lies substantially centrally of the body 10 and has the major dimension thereof along an axis identified as X—X in FIG. 1. Major body portions 14 and 16 are reversely similar lateral portions and are disposed uniformly on opposite sides of the X—X axis of symmetry of the body 10.

Lateral body portion 14 is integrally joined to 18 and 20 of substantially reduced cross-sectional area and which lie parallel to the axis identified in FIG. 1 as Y—Y. Similarly, lateral body portion 16 is integrally joined with the central body portion 12 by means of struts 22 and 24, both of which lie parallel to and uniformly spaced about the axis Y—Y.

The struts 18, 20, 22, and 24 define flexure areas to concentrate the strain effects of a load imposed between the central body portion 12 and the two lateral portions 14 and 16 by means to be described. The struts 18, 20, 22, and 24 are bored out to provide untapped holes 26 and 28, these holes being representative of similar holes bored through the struts 22 and 24. It will be observed in FIGS. 1 and 2 that the bored holes extend centrally through the struts and also through portions of the adjacent lateral body portions 14 and 16. The purpose of the bored holes is to minimize the cross-sectional area of the struts while maintaining substantial bending resistance.

The X and Y axes form part of a triaxial system X, Y, and Z as is clearly identified in FIGS. 1 and 2. The sensitive axes of the force transducer illustrated in FIGS. 1 and 2, that is, the axes along which load forces are measured and about which moments are measured, are the X and Z axes since loadings along these axes produce shear forces in the struts 18, 20, 22, and 24. A pure Y axis load imposes only compressive forces in the struts and, accordingly, is not measurable in accordance with the system herein described with reference to FIGS. 1 and 2. However, a triaxial system is described hereinafter with reference to FIGS. 5 and 6.

Central body portion 12 is provided with smooth, milled, parallel and opposite surfaces 30 and 32. Similarly, lateral body portions 14 and 16 are provided with smooth, parallel, and opposite plane surfaces 34, 36 and 38, 40 all of the aforementioned surfaces lying in parallel X-Y planes. However, as can be clearly seen in FIG. 2, surface 30 lies above coplanar surfaces 34 and 38 along the Z axis on one side of the transducer body 10 whereas lateral portion surfaces 36 and 40 lie above the central body portion surface 32 on the other side of the transducer body 10. For a typical force transducer having a four inch diameter the difference in axial elevation of the aforementioned surfaces is on the order of 0.05 inches.

The force transducer of which transducer body 10 is a part further includes force transmitting plate members 42 and 50 which are connected to the highest elevation body portion surfaces on the opposite sides of the disk-shaped transducer body 10, as best shown in FIG. 2. Plate member 42 is shown to comprise a flat disk of a diameter somewhat greater than the diameter of the transducer body 10 and having holes 44 bored therethrough to accommodate a spaced pair of machine screws which secure the plate member to the central body portion 30 of the transducer body by means of tapped holes 46. Accordingly, the interior surface of the plate member 42 abuts and is flush against the elevated surface 30 of the central body portion 12 and is spaced from the surfaces 34 and 38 of the lateral body portions 14 and 16 by approximately 0.05 inches along the Z axis. Force adapter plate member 42 is formed with a perimeter flange 48 to increase the stiffness thereof and to resist bending.

Plate member 50 is substantially similar to plate member 42 and is provided with holes 52 which cooperate with tapped holes 54 in the plane surfaces of lateral body portions 14 and 16 to permit the plate member 50 to be screwed to the transducer body 10. When in position, the inner plane surface of the plate member 52 abuts and is flush against the plane surfaces 36 and 40 of the lateral familiar portions 14 and 16 and is spaced from the surface 32 of the central body portion by approximately 0.05 inches. Plate member 50 is may provided with a perimeter ways 56 for increased stiffness. may To apply a load to the force transducer, plate 50 may be suitably anchored to one element of a force-producing system and plate member 42 may be suitably anchored to another element of a force-producing system. The introduction of a force along the X axis between plate members 42 and 50 is transmitted from plate member 42 to the central body portion 30 and thence through struts 18, 20, 22, and 24 to the lateral body portion 14 and 16 and thence to the anchored plate member 50.

It will be readily appreciated by those faimilar with load cells and similar devices that the geometry, configuration and proportion of the transducer body 10, as well as the plate members 42 and 50 mau be modified in many wasy to accommodate different specific environments. For example, the force transducer body 10 ma be fabricated in a square, rectangular, or other polygonal configuration. Similarly, the struts 18, 20, 22, and 24 need not be coplanar or arranged exactly as shown in the drawing as various modifications are possible.

Looking now to FIG. 3, a preferred arrangement of strain gage resistors 58 and 60 on the strut 18 is illustrated. In FIG. 3, the surface of strut 18 which appears is the same surface as appears in the plan view of FIG. 1 and this illustration is to be taken as representative of the preferred strain gage resistor configuration on each of the struts 18, 20, 22, and 24 in the two-axis device of FIG. 1. Similarly, strain gage arrangements corresponding to that described with reference to FIG. 3 are also found on the surfaces of struts 18, 20, 22, and 24 which are opposite those visible in the plan view of FIG. 1 such that eight individual pairs of strain gage resistors are employed in the implementation of the X axis strain gage system of FIGS. 1 and 2. As will be described hereinafter, another set of eight pairs of resistors is employed in the implementation of the Z axis measurement system.

Referring more specifically to FIG. 3, a laminated pair of strain gate resistors 58 and 60 is shown to be disposed on the surface of strut 18 so as to respond to the shear stress which is produced in the strut 18 by loading along either the X axis. Strain gage resistor 58 is a conventional strain-sensitive "rosette" suitably bonded to the surface of the strut 18 with the principal axis of sensitivity thereof disposed at 45° to the Y axis; i.e., exactly half-way between the X and Y axes, as illustrated in FIG. 3. Strain gage resistor 60 is disposed immediately over strain gage resistor 50, but is oriented with the principal axis of sensitivity thereof at 90° to the axis of sensitivity of strain gage resistor 58. The two strain gage resistors are laminated over one another by means of an insulating material, such as varnish or epoxy.

As previously mentioned, a second laminated pair of mutually orthogonal strain gage resistors is disposed on the side opposite the side of strut 18 which is visible in FIGS. 1 and 3. Accordingly, a total of four strain gate resistors, i.e., two pairs, is disposed on strut 18. Similarly, two pairs of stacked laminated strain gage resistors are disposed on each of struts 20, 22, and 24 making a total of sixteen strain gage resistors on the struts 18, 20, 22, and 24 for the purpose of monitoring forces having components along the X axis.

Referring now to FIGS. 4 and 5, the connection of the sixteen strain gage resistors on the struts 18, 20, 22, and 24 for measurement of forces along the X axis is shown. As will be apparent to those skilled in the strain measurement art, the network 61 illustrated in FIG. 4 is a variation on the well-known Wheatstone bridge which is commonly used to measure variations in electrical resistance. The bridge network 61 comprises legs 62, 64, 66, and 68 each of which comprises a pair of parallel-connected, resistive paths. In leg 62, for example, path 70 comprises individual series-connected resistors T1 and T2 while the parallel-connected path 72 comprises the series combination of individual resistors T3 and T4. Similarly, leg 64 comprises parallel-connected paths 74 and 76 of which path 74 comprises the series connection of strain gage resistors C1 and C2, while path 76 comprises the series combination of strain gage resistors C3 and C4.

The table of FIG. 4 is a key to the location of the individual resistors in the bridge network 61 in the physical arrangement of the transducer body 10, shown in FIGS. 1 and 2. In this arrangement it is to be understood that each individual resistive element, such as T1, T2, C1, C2, in FIG. 4 corresponds to an individual strain gage resistor or "rosette", such as 58 and 60, as disposed on the struts 18, 20, 22, and 24 of the transducer body 10 of FIGS. 1 and 2.

Each individual strain gage resistor is nominally of the same value, e.g., 350 ohms, and therefore, each leg 62, 64, 66, and 68 has a total nominal resistance of 350 ohms when the transducer body 10 is in the unstrained condition. The individual strain gage resistors identified as T1 and C1 in the bridge network 60 of FIG. 4 constitute a first laminated pair and are disposed on the top of strut 22; that is, the major surface of strut 22 which is in the plane of the paper in the drawing of FIG. 1. Similarly, individual resistive elements T3 and C3 comprise a second laminated pair of resistors mounted on the top of strut 18. In other words, the resistors T3 and C3 in the network 60 of FIG. 4 correspond with resistors 58 and 60 in the drawing of FIG. 3. The location of the remaining resistors in the bridge network 60 of FIG. 4 is clearly indicated by the table adjacent FIG. 4 in the drawings.

A dc source 78 of between 10 and 20 volts is connected between terminals 80 and 82 of the bridge network 60 while a volt meter 84 is connected between terminals 86 and 88 of the bridge network. Thus, as a variation in resistance occurs in one or more of the legs 62, 64, 66, and 68 of the bridge network 60, an unbalance condition occurs which produces a reading on the volt meter 84. This reading may be readily calibrated into force readings so as to indicate the quantity of force applied to the transducer body 10 along the X axis.

It can be seen that for a load applied to the transducer body 10 along the Y axis of FIG. 1 all of the strain gage resistors disposed on the struts 18, 20, 22, and 24 experience similar components of stress and, accordingly, experience similar quantities of resistance variation. Therefore, every element in the bridge network 60 of FIG. 4 changes correspondingly and the bridge network remains balanced. The same effect obtains for a pure Y axis compressive loading and, accordingly, the bridge network 60 is insensitive to Y axis loadings which invariable produce tensile and compression forces.

For Z axis loads, one side of each strut along the Z axis is placed in compression and the other side is placed in tension. However, it can be seen from the diagram and table of FIG. 4 that each series resistance pair, such as T1 and T2, comprises an individual strain gage resistor of which one is on the top and the other is on the bottom of a strut and, hence, as one resistive element increases in value, the other decreases by a corresponding amount. Accordingly, Z axis loadings have no effect in unbalancing the bridge network 60 of FIG. 4. A similar analysis obtains for torsional and bending loads on each of the struts 18, 20, 22, and 24.

Accordingly, the bridge circuit network 60 of FIG. 4 in operative association with the physical arrangement of the transducer body 10 of FIGS. 1 and 2 produces a force transducer which is purely responsive to shear stresses and, by virtue of the overall arrangement, exclusively responsive to a load imposed along the X axis.

The other axis of sensitivity of the force transducer illustrated in FIGS. 1 and 2 is the Z axis, as previously mentioned. To implement the Z axis system, a second bridge network substantially identical to bridge network 60 of FIG. 4 is established. Again, the struts 18, 20, 22, and 24 constitute the support system for the strain gage resistors and, again, laminated pairs of strain gage resistors are employed. However, the laminated pairs are mounted on the struts at locations which are disposed at 90° around the strut, i.e., rotated around an axis parallel to the Y axis, as shown in FIG. 1. A representative pair 90, 92 of individual strain gage resistors disposed in a stacked and laminated combination is shown on the strut 20 of FIG. 2. Again a total of sixteen individual strain gage resistors is employed to constitute the series-parallel Wheatstone bridge measurement network which is required to implement the Z axis load-sensitive system in such a fashion as to be insensitive to tensile and compressive loadings as well as torsional and bending loads and, thus, to produce a system which is exclusively responsive to Z axis loads which produce a shear stress in the struts 18, 20, 22, and 24.

Figure 7:
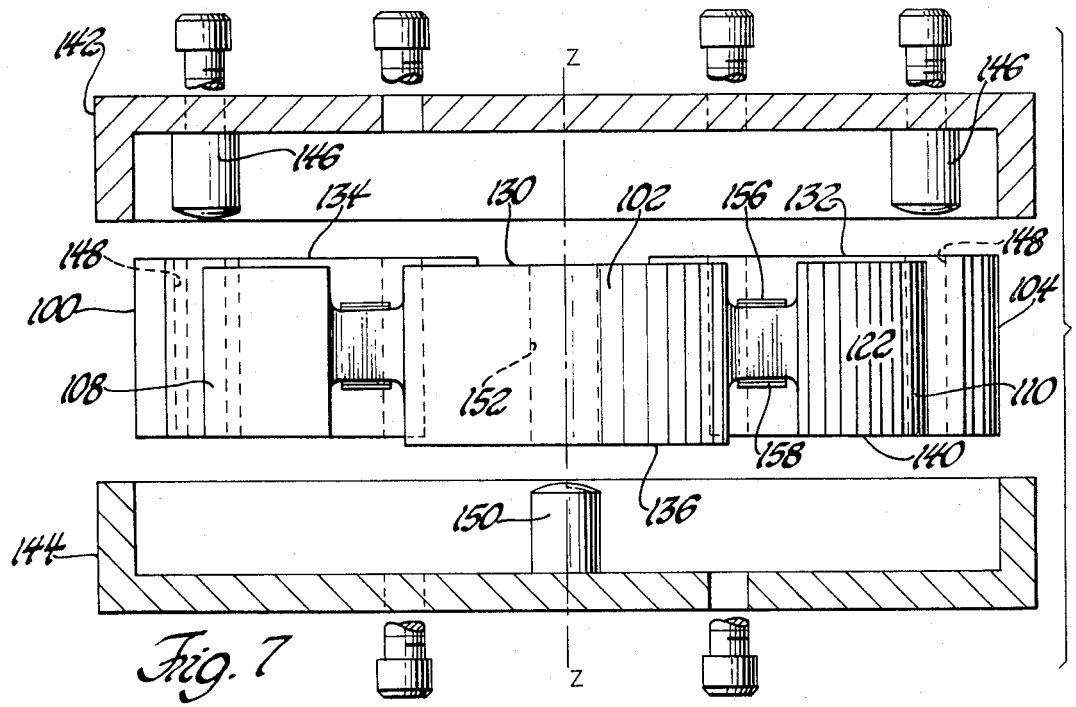
FIG. 7 is an end view, partly in cross-section of the force transducer of FIG. 6.

Referring now to FIGS. 6 and 7, a three-axis load cell or force transducer is shown. The three-axis force transducer again comprises a transducer body 94 of generally disk shape and fabricated as an integral unit from high modulus of elasticity material, such as tool steel or aluminum. Transducer body 94 is formed with a central bore 96 which extends along and is centered about an axis of symmetry, identified in FIGS. 6 and 7 as Z—Z. Four uniformly-spaced radial cuts extending from the bore 96 effectively divide the body 94 into four major sectors 98, 100, 102, 104 of large cross-sectional area and consequential high rigidity. A transverse axis X—X passes commonly through the major sectors 98 and 102 and is perpendicular to the axis of symmetry Z—Z. Similarly, an axis Y—Y passes commonly through the major sectors 100 and 104 and is mutually perpendicular to both the X and Z axes. Accordingly, the X, Y, and Z axes designated in FIGS. 6 and 7 are useful not only in describing the geometry of the body 94, but also define the sensitive axes of the force transducer.

Transducer body 94 is also machined in such a fashion as to define four minor sectors 106, 108, 110, and 112. Minor sector 106 is joined to the major sector 98 by means of a strut 114 of substantially reduced cross-sectional area and to major sector 100 by means of a strut 116. Similarly, minor sector 108 is joined to major sector 100 by means of strut 118 and to major sector 102 by means of strut 120. Minor sector 110 is joined to major sector 102 by means of strut 122, and the major sector 104 by strut 124. Finally, minor sector 112 is joined to major sector 104 by means of strut 126 and to major sector 98 by means of strut 128. It is apparent in FIG. 6 that struts 114, 120, 122, and 128 are all parallel to the Y axis while struts 116, 118, 124, and 126 are all parallel to the X axis. Accordingly, a comparison of the transducer body 94 in FIG. 6 to the two-axis transducer body 10 of FIG. 1 indicates the presence of a second set of four parallel struts and, hence, provides the basis for the third axis of measurement.

As best shown in FIG. 7, the surfaces 130 of the major sectors 98 and 102 are of lesser height than the coplanar surfaces 132 and 134 of the major sectors 104 and 100, respectively, measured along the X axis. Conversely, the coplanar surfaces 136 of the major sectors 98 and 102 are higher in elevation than the coplanar surfaces 138 and 140 on the opposite sides of the transducer body measured along the Z axis. This difference in axial elevation facilitates the connection of a flanged plate member 142 exclusively to the surfaces 132 and 134 on the upper side of the transducer body 94, as shown in FIG. 7, and facilitates the connection of the flanged plate member 144 exclusively to the surfaces 136 of the major sectors 98 and 102 on the opposite side of the transducer body.

In addition to the machine screws illustrated in FIG. 7 for the purpose of mechanically connecting the plate members 142 and 144 to the respective major sector surfaces, a pair of alignment pins 146 are disposed on the inner surface of the plate member 142 and extend along the Z axis to be received into corresponding sockets or cavities 148 in the transducer body 94. Similarly, locator pins or alignment pins 150 depend from the inner surface of plate member 144 and enter sockets or cavities 152 in the transducer body.

By virtue of the plate member interconnection to opposite pairs of major sectors on opposite sides of the transducer body 94, as shown in FIG. 7, load may be transferred from one plate member to the other through the transducer body in such a fashion as to produce flexure in the struts. By strain gage resistor arrangement hereinafter described, the X, Y, and Z components of these forces may be separately and independently identified solely by measurement of shear stress.

As indicated in FIG. 6, each strut carries on the upper surface thereof a laminated pair of strain gage resistors having mutually orthogonal axes of sensitivity and being disposed on a diagonal, that is, at 45° to the axis of the strut on which it is placed. Strain gage resistor pair 156 disposed on strut 122 is representative. Similarly, stacked pairs of strain gage resistors are mounted on all eight of the struts on the side opposite that shown in FIG. 6. Looking to FIG. 7, strain gage resistor pair 158 mounted on the underside of strut 122 is representative. Finally, a third set of stacked, laminated strain gage resistor pairs is mounted on the side surfaces of struts 124, 126, 116, and 118, as best shown in FIG. 6. Strain gage resistor pair 162 on strut 124 is representative.

The electrical interconnection of the strain gage resistor pairs into an electrical bridge network of the type shown in FIG. 4 is readily accomplished with each of the three sets of sixteen individual strain gage resistors found on the transducer body 94 of FIGS. 6 and 7. The strain gage resistor pairs mounted on struts 114, 120, 122, and 128 are connected together to form the X axis bridge network. The interconnection follows the identical pattern as was followed for struts 22, 24, 20, and 18, respectively, in interconnecting the strain gage resistors in the X axis bridge netwrok of FIGS. 1 and 4. The individual details of this interconnection will, therefore, not be repeated. A separate and independent Y axis bridge is established by interconnecting the strain gage resistors on the struts 116, 118, 124, and 126 in an identical fashion. Finally, a Z axis bridge is established by interconnecting the strain gage resistors on the side surfaces of struts 116, 118, 124, and 126 in an identical fashion. The result is three, separate and independent bridge networks each responsive only to force components along the respective axis of sensitivity and each responding only to shear. Complete compensation against the sensation of tension, compression, bending and torsion is accomplished in the fashion described with reference to FIG. 1, 2 and 4.

The force transducer of FIGS. 6 and 7, like the force transducer FIGS. 1 and 2, can also be employed as a torque sensor. To adapt the device to a torque sensor from the linear axis force sensor previously described, a minor reconnection of strain gage elements is required. However, no physical modification of the force transducer body 94 or the location of the individual strain gage resistors on the body is required.

To measure torques or moments about the X and Y axes the strain gage resistors for measuring Z axis forces are employed. However, because the shear stress on one side of the axis of sensitivity is opposite in direction to the shear stresses in the struts on the opposite side of the axis of sensitivity rather than in the same direction, the bridge networks are rewined by reversing the polarities on one half of the bridge. This has the effect of cancelling the Z axis force and adding the two shear force measurements on the opposite side of the axis of sensitivity to produce a pure torque indication.

To measure a moment or torque about the Z axis, a set of sixteen individual strain gage resistors on four selected struts are interconnected into a bridge circuit so as to measure tension in the struts at the corners defined by the minor sectors 108 and 112 and to measure the compression at the struts interconnecting the minor sectors 106 and 110. A straightforward electrical interconnection of the bridge circuit elements is believed to be apparent.

In summary, it has been shown that a simple, effective, and highly-accurate multiple-axis force transducer has been disclosed wherein all force measurements are made by measuring shear forces in the flexure struts interconnecting the major transducer body portions. The bridge interconnection described herein is self-compensating against minor resistor errors as well as against bending, torsion, tension, and compression forces. The subject device is easily accommodated to a wide range of forces, for example, from 2,000 pound per axis to 50,000 pound per axis. The device finds many uses including the measurement of force distribution in bumpers, steering columns, steering wheels, trailer hitches, crash barriers, mannequins, and vehicle wheels. It will be apparent to those skilled in the art that many modifications from the device described herein are possible and, accordingly, the foregoing specification is not to be construed in a limiting sense.

The embodiments of the invention in which an exclusive property or privilege is claimed are defined as follows:

1. A force transducer comprising: a solid, substantially disk-shaped body of high modulus of elasticity material, said body including openings formed therein to define at least first and second rigid and integral major portions interconnected by relatively short shear struts having substantial bending resistance and being of reduced cross-sectional area, each of said first and second rigid major portions having opposite and parallel plane surfaces, said openings extending between said surfaces, a first plate member exclusively connected to one of the plane surfaces of the first portion and spaced from the corresponding plane surface of the second portion, and a second plate member exclusively connected to the opposite surface of the second portion and spaced from the corresponding surface of the first portion; and strain sensitive means disposed on the struts and connected exclusively to monitor shear in the struts as a consequence of forces applied to said body through said plate members along at least two axes of said body.

2. A force transducer as defined in claim 1 wherein the first and second body portions are substantially coplanar sections of said disk-shaped body, but the plane surfaces of the first and second portions are offset along the axis of symmetry by substantially less than the axial thickness of said body so as to be non-coplanar, the surface of the first portion being higher along said axis than the surface of the second portion on one side of the body, the surface of the second portion being higher along said axis than the surface of the first portion on the other side of the body to facilitate the exclusive connections of the plate members thereto.

3. A force transducer as defined in claim 2 wherein said strain-sensitive means comprises laminated pairs of strain-gage resistors disposed on orthogonally oriented sides of the struts with the axes of sensitivity of the resistors in each pair being mutually perpendicular, and at least one electrical bridge network including selected ones of said resistors connected to define four legs, each leg having two parallel paths of two resistors each, the resistors of each path being disposed on opposite sides of the same strut, and the resistors of one path being on a different strut than the resistors of the parallel path associated therewith to render the bridge network electrically non-responsive to bending loads.

4. A force transducer as defined in claim 2 wherein each of said plate members comprises a flat disk overlying the plane surface of the body portion to which it is connected, and a perimeter flange to stiffen the plate member to resist bending under load.

5. A two-axis force transducer comprising: a solid, body of high modulus of elasticity material and having a transverse axis of symmetry, said body including a rigid central portion and two reversely similar, rigid, lateral portions spaced from the central portion about said axis and being joined to said central portion by pairs of struts of substantially reduced cross-section, said struts being parallel and perpendicular to said axis, each of said central and lateral portions having opposite, parallel plane surfaces, a first plate member connected exclusively to the plane surface of said central portion on one side of the body, a second plate member connected exclusively to the plane surfaces of the lateral portions on the other side of the body, said strain-sensitive means on said struts to monitor shear in the struts as a consequence of forces applied to aid body through the plate members.

6. A force transducer as defined in claim 5 wherein the body is substantially disk-shaped, the opposite plane surfaces of the central portion are non-coplanar with the corresponding plane surfaces of the lateral portions, the plane surface of the central portion being above the corresponding lateral portion plane surfaces on one side of the body and below the corresponding lateral portion plane surfaces on the other side of the body to facilitate the exclusive connections thereto and to provide a mechanical stop during flexure of the body.

7. A force transducer as defined in claim 6 wherein each of said plate members comprise a flat disk overlying the plane surface of the body portion to which it is connected, and a perimeter flange to stiffen the plate member to resist bending under load.

8. A force transducer as defined in claim 5 wherein said strain sensitive means comprises laminated pairs of strain gage resistors disposed on said struts and means connecting the resistors into an electrical bridge network.

9. A force transducer as defined in claim 5 wherein each of the struts is rendered hollow by a bore extending longitudinally therethrough and through an adjacent lateral body portion.

10. A force transducer as defined in claim 5 wherein each of the plate members carries at least one locator pin extending therefrom, and a recess in each of the central and lateral body portions to receive a locator pin therein.

11. A three-axis force transducer comprising: a solid, disk-shaped body of high modulus of elasticity material and having an axis of symmetry; said body including four major sectors arranged uniformly about the axis, four minor sectors disposed between the major sectors, and orthogonally arranged pairs of struts connecting the minor sectors to the adjacent major sectors, the major and minor sectors being physically separated from one another in the body except for the interconnection of said struts, each of the major sectors having parallel and opposite plane surfaces, a first plate exclusively connected to the plane surfaces of a first diametrically opposite pair of major sectors on one side thereof, a second plate exclusively connected to the plane surfaces of the other diametrically opposite pair of major sectors on the other side thereof, and strain-sensitive means on said struts to monitor shear in the struts as a consequence of forces applied to said body through the plates.

12. A force transducer as defined in claim 11 wherein the plane surfaces of a first diametrically opposite pair of major sectors lie above the surfaces of the second pair of sectors on one side of the body, and lie below the surfaces of the second pair on the opposite side of the body, the plates being connected to the higher surfaces on the opposite sides to produce shear forces in the struts when loaded.

13. A force transducer as defined in claim 11 wherein each of the plates is a flat disk of greater diameter than the transducer body and having a perimeter flange for stiffening purposes.

14. A force transducer as defined in claim 11 wherein each of the plates includes a pair of pins extending therefrom on opposite sides of and parallel to the axis of symmetry, each of the major sectors including a cavity into which a plate pin fits to secure the plates to the transducer body.

15. A force transducer as defined in claim 11 wherein the strain sensitive means includes strain-gage resistors disposed on the struts.

16. A force transducer as defined in claim 15 wherein the resistors are arranged in laminated pairs on opposite sides of the struts, the sensitive axes of the resistors in each pair being mutually orthogonal and non-aligned with the longitudinal axis of the strut on which the pair is disposed, the resistors on the four struts parallel to one transverse axis being connected into a first shear sensitive bridge network and the resistors on the four struts parallel to the other transverse axis being connected into a second shear sensitive bridge network.

17. A force transducer as defined in claim 16 wherein the first bridge network comprises four major legs, each leg including two parallel connected paths having two series-connected resistors in each path, the resistors in each path being selected from opposite sides of a strut, all of the resistors in each leg being of like tensile-compressive response to load forces applied to the body along a selected axes of measurement, thereby to render the entire network sensitive exclusively to shear forces along an axis through the body perpendicular to the longitudinal axis of the struts on which the network resistors are disposed.

18. A force transducer as defined in claim 17 including additional strain-gage resistors on the surfaces of the struts parallel to the axis of symmetry, and means for connecting the resistors into a bridge network for measuring shear in the struts as a consequence of a load between said plates along the axis of symmetry.

* * * * *

UNITED STATES PATENT OFFICE
CERTIFICATE OF CORRECTION

Patent No. 3,771,359  Dated November 13, 1973

Inventor(s) Ralph S. Shoberg, Farmington, Michigan

It is certified that error appears in the above-identified patent and that said Letters Patent are hereby corrected as shown below:

In the Specification:
Column 4, lines 20 to 23, delete "Plate member 50 is may provided with a perimeter ways 56 for increased stiffness. may" and insert therefor --Plate member 50 is also provided with a perimeter flange 56 for increased stiffness.

Column 4, line 36, delete "mau" and insert --may--.
line 37, delete "wasy" and insert --ways--.
line 39, delete "ma" and insert --may--.

Column 5, line 12, delete "gate" and insert --gage--.

Column 6, line 17, delete "invariable" and insert --invariably--.

Column 7, line 36, "X axis" should be --Z axis--.
Column 8, line 27, delete "netwrok" and insert --network--
line 56, delete "rewined" and insert --rewired--.

Signed and sealed this 10th day of September 1974.

(SEAL)
Attest:

McCOY M. GIBSON, JR.
Attesting Officer

C. MARSHALL DANN
Commissioner of Patents